United States Patent
Wang et al.

(10) Patent No.: US 12,096,441 B2
(45) Date of Patent: Sep. 17, 2024

(54) METHODS, TERMINAL DEVICE AND NETWORK NODE FOR UPLINK TRANSMISSION

(71) Applicant: Telefonaktiebolaget LM Ericsson (publ), Stockholm (SE)

(72) Inventors: Min Wang, Luleå (SE); Jinhua Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 288 days.

(21) Appl. No.: 17/605,743

(22) PCT Filed: May 11, 2020

(86) PCT No.: PCT/CN2020/089565
§ 371 (c)(1),
(2) Date: Oct. 22, 2021

(87) PCT Pub. No.: WO2020/228665
PCT Pub. Date: Nov. 19, 2020

(65) Prior Publication Data
US 2022/0256575 A1      Aug. 11, 2022

(30) Foreign Application Priority Data
May 13, 2019    (WO) ................ PCT/CN2019/086722

(51) Int. Cl.
*H04W 72/21* (2023.01)
*H04L 5/00* (2006.01)
*H04W 72/23* (2023.01)

(52) U.S. Cl.
CPC ........... *H04W 72/21* (2023.01); *H04L 5/0055* (2013.01); *H04W 72/23* (2023.01)

(58) Field of Classification Search
CPC ... H04W 72/21; H04W 72/23; H04W 72/115; H04W 72/56; H04L 5/0055; H04L 1/1854; H04L 1/1887
See application file for complete search history.

(56) References Cited

U.S. PATENT DOCUMENTS

| | | | |
|---|---|---|---|
| 6,438,115 B1 | 8/2002 | Mazur et al. | |
| 2011/0038264 A1* | 2/2011 | Ishii | H04L 47/10 370/238 |

(Continued)

FOREIGN PATENT DOCUMENTS

| | | | |
|---|---|---|---|
| CN | 104685955 A | 6/2015 | |
| CN | 109155726 A | 1/2019 | |

(Continued)

OTHER PUBLICATIONS

"Discussion on UCI enhancement for URLLC", 3GPP TSG RAN WG1 #97, R1-1906866, Reno, USA, May 13-17, 2019, pp. 1-11.

(Continued)

*Primary Examiner* — Steven Hieu D Nguyen
(74) *Attorney, Agent, or Firm* — Murphy, Bilak & Homiller, PLLC

(57) ABSTRACT

Methods, a terminal device and a network node are disclosed for uplink transmission. According to an embodiment, the terminal device determines priority information about a first uplink control information (UCI) associated with a physical uplink shared channel (PUSCH) transmission using a configured grant and a second UCI carried by a physical uplink control channel (PUCCH). The terminal device transmits at least part of the first and second UCIs based on the determined priority information.

10 Claims, 12 Drawing Sheets

(56) References Cited

U.S. PATENT DOCUMENTS

| | | | |
|---|---|---|---|
| 2015/0223235 | A1 | 8/2015 | Hwang et al. |
| 2018/0007681 | A1 | 1/2018 | Yang et al. |
| 2018/0062724 | A1 | 3/2018 | Onggosanusi et al. |
| 2018/0167933 | A1 | 6/2018 | Yin et al. |
| 2018/0359057 | A1 | 12/2018 | Yang et al. |
| 2019/0037586 | A1 | 1/2019 | Park et al. |
| 2020/0403735 | A1 | 9/2020 | Zhao |
| 2021/0378006 | A1* | 12/2021 | Takeda .................. H04L 1/1819 |
| 2022/0174721 | A1* | 6/2022 | Oviedo ................. H04L 5/0053 |

FOREIGN PATENT DOCUMENTS

| | | | |
|---|---|---|---|
| CO | 5280165 | A1 | 5/2003 |
| WO | 2018085790 | A1 | 5/2018 |

OTHER PUBLICATIONS

"DL/UL intra-UE transmission prioritization and multiplexing", 3GPP TSG RAN WG1 Meeting #94bis, R1-1810718, Chengdu, China, Oct. 8-12, 2018, pp. 1-9.

"Enhancements to configured grants for NR-unlicensed", 3GPP TSG RAN WG1 Meeting #97, R1-1906788, Reno, Nevada, May 13-17, 2019, pp. 1-9.

"Maintenance Issues on UCI Multiplexing on PUCCH", 3GPP TSG-RAN WG1 Meeting #95, R1-1813949, Spokane, USA, Nov. 12-16, 2018, pp. 1-14.

"On intra-UE prioritization enablers", 3GPP TSG RAN WG1 Meeting #97, Tdoc R1-1906097, Reno, USA, May 13-17, 2019, pp. 1-11.

"On UCI multiplexing on PUSCH", 3GPP TSG RAN WG1 Meeting #93, R1-1806296, Busan, Korea, May 21-25, 2018, pp. 1-8.

"3GPP TR 38.889 V16.0.0", 3rd Generation Partnership Project; Technical Specification Group Radio Access Network; Study on NR-based access to unlicensed spectrum (Release 16), Dec. 2018, pp. 1-119.

"Enhancement to configured grants in NR unlicensed", 3GPP TSG RAN WG1 Meeting #96bis, R1-1905002, Xian, China, Apr. 8-12, 2019, pp. 1-10.

"Potential enhancements to PUSCH", 3GPP TSG RAN WG1 Ad Hoc Meeting 1901, R1-1900688, Taipei, Taiwan, Jan. 21-25, 2019, pp. 1-4.

* cited by examiner

METHODS, TERMINAL DEVICE AND NETWORK NODE FOR UPLINK TRANSMISSION

TECHNICAL FIELD

Embodiments of the disclosure generally relate to wireless communication, and, more particularly, to methods, a terminal device and a network node for uplink transmission.

BACKGROUND

This section introduces aspects that may facilitate better understanding of the present disclosure. Accordingly, the statements of this section are to be read in this light and are not to be understood as admissions about what is in the prior art or what is not in the prior art.

Next generation systems are expected to support a wide range of use cases with varying requirements ranging from fully mobile devices to stationary Internet of things (IoT) or fixed wireless broadband devices. The traffic pattern associated with many use cases is expected to consist of short or long bursts of data traffic with varying length of waiting period in between (here called inactive state). In new radio (NR), both license assisted access and standalone unlicensed operation are to be supported in 3rd generation partnership project (3 GPP).

In order to tackle with the ever increasing data demanding, NR is considered both licensed and unlicensed spectrum. Compared to the long term evolution (LTE) licensed assisted access (LAA), NR-based access to unlicensed spectrum (NR-U) also needs to support dual connectivity (DC) and standalone scenarios, where the media access control (MAC) procedures including random access channel (RACH) and scheduling procedure on unlicensed spectrum are subject to the listen before talk (LBT) failures, while there is no such restriction in LTE LAA, since there is licensed spectrum in LAA scenario so the RACH and scheduling related signaling can be transmitted on the licensed spectrum instead of unlicensed spectrum.

For discovery reference signal (DRS) transmission such as primary synchronization signal (PSS)/secondary synchronization signal (SSS), physical broadcast channel (PBCH), channel state information reference signal (CSI-RS), control channel transmission such as physical uplink control channel (PUCCH)/physical downlink control channel (PDCCH), physical data channel such as physical uplink shared channel (PUSCH)/physical downlink shared channel (PDSCH), and uplink sounding reference signal such as SRS transmission, channel sensing should be applied to determine the channel availability before the physical signal is transmitted using the channel.

The radio resource management (RRM) procedures in NR-U would be generally rather similar as in LAA, since NR-U is aiming to reuse LAA/enhanced LAA (eLAA)/further enhanced LAA (feLAA) technologies as much as possible to handle the coexistence between NR-U and other legacy radio access technologies (RATs). RRM measurements and report comprising special configuration procedure with respect the channel sensing and channel availability.

Hence, channel access/selection for LAA was one of important aspects for co-existence with other RATs such as Wi-Fi. For instance, LAA has aimed to use carriers that are congested with Wi-Fi.

In licensed spectrum, user equipment (UE) measures Reference Signal Received Power (RSRP), and Reference Signal Received Quality (RSRQ) of the downlink radio channel (e.g. synchronization signal (SS) and PBCH block simply referred to as SSB, CSI-RS), and provides the measurement reports to its serving evolved node B (eNB)/next generation node B (gNB). However, they don't reflect the interference strength on the carrier. Another metric Received Signal Strength Indicator (RSSI) can serve for such purpose. At the eNB/gNB side, it is possible to derive RSSI based on the received RSRP and RSRQ reports. However, this requires that they must be available. Due to the LBT failure, some reports in terms of RSRP or RSRP may be blocked (can be either due to that the reference signal transmission (DRS) is blocked in the downlink or the measurement report is blocked in the uplink). Hence, the measurements in terms of RSSI are very useful. The RSSI measurements together with the time information concerning when and how long time that UEs have made the measurements can assist the gNB/eNB to detect the hidden node. Additionally, the gNB/eNB can measure the load situation of the carrier which is useful for the network to prioritize some channels for load balance and channel access failure avoidance purposes.

LTE LAA has defined to support measurements of averaged RSSI and channel occupancy for measurement reports. The channel occupancy is defined as percentage of time that RSSI is measured above a configured threshold. For this purpose, a RSSI measurement timing configuration (RMTC) includes a measurement duration (e.g. 1-5 ms) and a period between measurements (e.g. {40, 80, 160, 320, 640} ms).

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for uplink transmission.

According to a first aspect of the disclosure, there is provided a method in a terminal device. The method may comprise determining priority information about a first uplink control information (UCI) associated with a physical uplink shared channel (PUSCH) transmission using a configured grant and a second UCI carried by a physical uplink control channel (PUCCH). The method may further comprise transmitting at least part of the first and second UCIs based on the determined priority information.

In an embodiment of the disclosure, the PUSCH transmission carrying the first UCI and the PUCCH transmission carrying the second UCI may be overlapped in time.

In an embodiment of the disclosure, the at least part of the first and second UCIs may be one of: the first UCI; the second UCI; the first UCI and the second UCI; the first UCI and part of the second UCI which are merged as one UCI; the second UCI and part of the first UCI which are merged as one UCI; and part of the first UCI and part of the second UCI which are merged as one UCI.

In an embodiment of the disclosure, the priority information may comprise a first priority for the first UCI and a second priority for the second UCI. Alternatively, the priority information may comprise a relative priority between the first and second UCIs.

In an embodiment of the disclosure, the first priority for the first UCI may be determined based on the corresponding PUSCH transmission priority.

In an embodiment of the disclosure, the priority information may be determined based at least on a priority of at least one logical channel associated with each of the first and second UCIs.

In an embodiment of the disclosure, the priority of the at least one logical channel associated with each of the first and second UCIs may be determined based on one of: a priority of data of the at least one logical channel for which each of the first and second UCIs is generated; and a predefined relative priority between at least one uplink logical channel associated with the first UCI and at least one downlink logical channel associated with the second UCI.

In an embodiment of the disclosure, the priority information may be determined based at least on a latency budget of data associated with each of the first and second UCIs.

In an embodiment of the disclosure, the determined priority information may indicate that the first UCI is prioritized over the second UCI in response to one or more of followings: remaining latency budget of uplink data associated with the first UCI is smaller than a first predetermined threshold; and a queuing delay of uplink data associated with the first UCI is larger than a second predetermined threshold.

In an embodiment of the disclosure, the priority information may be determined based at least on a transmission reliability requirement of data associated with each of the first and second UCIs.

In an embodiment of the disclosure, the priority information may be determined based at least on a predefined or preconfigured relative priority between the first and second UCIs.

In an embodiment of the disclosure, the first UCI may be predefined or preconfigured to have a higher priority than the second UCI which does not carry hybrid automatic repeat request (HARQ) non-acknowledgement (NACK).

In an embodiment of the disclosure, the terminal device may be configured with multiple PUCCH resources and/or configured grants of multiple configured scheduling configurations. Corresponding priority information may be preconfigured in the terminal device for each pair of a PUCCH resource and a configured scheduling configuration.

In an embodiment of the disclosure, when the priority information indicates that the first UCI has a higher priority than the second UCI, transmitting at least part of the first and second UCIs based on the determined priority information may comprise one or more of: transmitting the second UCI in a PUCCH cell which is different than current PUCCH cell; transmitting the second UCI through random access in a cell which is different than current cell triggering the second UCI; transmitting only the first UCI; transmitting the first and second UCIs in this order with a delay between the two transmissions; and transmitting, as one merged UCI, at least part of the first UCI and at least part of the second UCI.

In an embodiment of the disclosure, when the priority information indicates that the second UCI has a higher priority than the first UCI, transmitting at least part of the first and second UCIs based on the determined priority information may comprise one or more of: transmitting only the second UCI; transmitting the second and first UCIs in this order with a delay between the two transmissions; simultaneously transmitting the second UCI and PUSCH using the configured grant; and transmitting, as one merged UCI, at least part of the first UCI and at least part of the second UCI.

In an embodiment of the disclosure, one or more fields in the first and/or second UCI with lower priorities may be removed from the one merged UCI.

In an embodiment of the disclosure, when the first UCI is lower prioritized than the second UCI and not transmitted, the configured grant for the PUSCH comprising the first UCI may be skipped.

In an embodiment of the disclosure, when the second UCI is transmitted, the second UCI may be carried as a sub media access control (MAC) protocol data unit (PDU) in an MAC PDU mapped into a PUSCH using the configured grant.

In an embodiment of the disclosure, the sub MAC PDU may be disposed in a front position of the MAC PDU.

In an embodiment of the disclosure, the sub MAC PDU may be a MAC control element (CE).

In an embodiment of the disclosure, the determining and the transmitting may be performed in a same way or differently for different cell/carrier/bandwidth part/channel/subband.

In an embodiment of the disclosure, the method may further comprise providing user data and forwarding the user data to a host computer via the transmission to the base station.

According to a second aspect of the disclosure, there is provided a method in a network node. The method may comprise determining priority information about a first UCI associated with a PUSCH transmission using a configured grant and a second UCI carried by a PUCCH and/or at least one configuration for transmitting at least part of the first and second UCIs. The method may further comprise transmitting the priority information and/or the at least one configuration to a terminal device.

In an embodiment of the disclosure, the priority information may comprise at least one relative priority between the first and second UCIs. Alternatively, the priority information may comprise at least one group of a first priority for the first UCI and a second priority for the second UCI.

In an embodiment of the disclosure, a number of the at least one relative priority or the at least one group may be more than one. Each of the more than one relative priorities or the more than one groups may correspond to a pair of a PUCCH resource and a configured scheduling configuration.

In an embodiment of the disclosure, when the priority information indicates that the first UCI has a higher priority than the second UCI, the at least one configuration for transmitting at least part of the first and second UCIs may comprise one or more of: transmitting the second UCI in a PUCCH cell which is different than current PUCCH cell; transmitting the second UCI through random access in a cell which is different than current cell triggering the second UCI; transmitting only the first UCI; transmitting the first and second UCIs in this order with a delay between the two transmissions; and transmitting, as one merged UCI, at least part of the first UCI and at least part of the second UCI.

In an embodiment of the disclosure, when the priority information indicates that the second UCI has a higher priority than the first UCI, the at least one configuration for transmitting at least part of the first and second UCIs may comprise one or more of: transmitting only the second UCI; transmitting the second and first UCIs in this order with a delay between the two transmissions; simultaneously transmitting the second UCI and physical uplink shared channel, PUSCH, using the configured grant; and transmitting, as one merged UCI, at least part of the first UCI and at least part of the second UCI.

In an embodiment of the disclosure, the priority information may comprise relative priorities between different fields contained in the first and second UCIs.

In an embodiment of the disclosure, the priority information and/or the at least one configuration may be the same or different for different cell/carrier/bandwidth part/channel/subband.

According to a third aspect of the disclosure, there is provided a terminal device. The terminal device may comprise at least one processor and at least one memory. The at least one memory may contain instructions executable by the at least one processor, whereby the terminal device may be operative to determine priority information about a first UCI associated with a PUSCH transmission using a configured grant and a second UCI carried by a PUCCH. The terminal device may be further operative to transmit at least part of the first and second UCIs based on the determined priority information.

In an embodiment of the disclosure, the terminal device may be operative to perform the method according to the above first aspect.

According to a fourth aspect of the disclosure, there is provided a network node. The network node may comprise at least one processor and at least one memory. The at least one memory may contain instructions executable by the at least one processor, whereby the network node may be operative to determine priority information about a first UCI associated with a PUSCH transmission using a configured grant and a second UCI carried by a PUCCH and/or at least one configuration for transmitting at least part of the first and second UCIs. The network node may be further operative to transmit the priority information and/or the at least one configuration to a terminal device.

In an embodiment of the disclosure, the network node may be operative to perform the method according to the above second aspect.

According to a fifth aspect of the disclosure, there is provided a computer program product. The computer program product may comprise instructions which when executed by at least one processor, cause the at least one processor to perform the method according to any of the above first and second aspects.

According to a sixth aspect of the disclosure, there is provided a computer readable storage medium. The computer readable storage medium may comprise instructions which when executed by at least one processor, cause the at least one processor to perform the method according to any of the above first and second aspects.

According to a seventh aspect of the disclosure, there is provided a terminal device. The terminal device may comprise a determination module for determining priority information about a first UCI associated with a PUSCH transmission using a configured grant and a second UCI carried by a PUCCH. The terminal device may further comprise a transmission module for transmitting at least part of the first and second UCIs based on the determined priority information.

According to an eighth aspect of the disclosure, there is provided a network node. The network node may comprise a determination module for determining priority information about a first UCI associated with a PUSCH transmission using a configured grant and a second UCI carried by a PUCCH and/or at least one configuration for transmitting at least part of the first and second UCIs. The network node may further comprise a transmission module for transmitting the priority information and/or the at least one configuration to a terminal device.

According to a ninth aspect of the disclosure, there is provided a method implemented in a communication system including a host computer, a base station and a terminal device. The method may comprise, at the host computer, receiving user data transmitted to the base station from the terminal device. The terminal device may determine priority information about a first UCI associated with a PUSCH transmission using a configured grant and a second UCI carried by a PUCCH. The terminal device may transmit at least part of the first and second UCIs based on the determined priority information.

In an embodiment of the disclosure, the method may further comprise, at the terminal device, providing the user data to the base station.

In an embodiment of the disclosure, the method may further comprise, at the terminal device, executing a client application, thereby providing the user data to be transmitted. The method may further comprise, at the host computer, executing a host application associated with the client application.

In an embodiment of the disclosure, the method may further comprise, at the terminal device, executing a client application. The method may further comprise, at the terminal device, receiving input data to the client application. The input data may be provided at the host computer by executing a host application associated with the client application. The user data to be transmitted may be provided by the client application in response to the input data.

According to a tenth aspect of the disclosure, there is provided a communication system including a host computer comprising a communication interface configured to receive user data originating from a transmission from a terminal device to a base station. The terminal device may comprise a radio interface and processing circuitry. The processing circuitry of the terminal device may be configured to determine priority information about a first UCI associated with a PUSCH transmission using a configured grant and a second UCI carried by a PUCCH. The processing circuitry of the terminal device may be further configured to transmit at least part of the first and second UCIs based on the determined priority information.

In an embodiment of the disclosure, the communication system may further include the terminal device.

In an embodiment of the disclosure, the communication system may further include the base station. The base station may comprise a radio interface configured to communicate with the terminal device and a communication interface configured to forward to the host computer the user data carried by a transmission from the terminal device to the base station.

In an embodiment of the disclosure, the processing circuitry of the host computer is configured to execute a host application. The processing circuitry of the terminal device is configured to execute a client application associated with the host application, thereby providing the user data.

In an embodiment of the disclosure, the processing circuitry of the host computer may be configured to execute a host application, thereby providing request data. The processing circuitry of the terminal device may be configured to execute a client application associated with the host application, thereby providing the user data in response to the request data.

According to an eleventh aspect of the disclosure, there is provided a method implemented in a communication system including a host computer, a base station and a terminal device. The method may comprise, at the host computer, providing user data. The method may further comprise, at the host computer, initiating a transmission carrying the user data to the terminal device via a cellular network comprising the base station. The base station may determine priority information about a first UCI associated with a PUSCH transmission using a configured grant and a second UCI carried by a PUCCH and/or at least one configuration for transmitting at least part of the first and second UCIs. The base station may transmit the priority information and/or the at least one configuration to a terminal device.

In an embodiment of the disclosure, the method may further comprise, at the base station, transmitting the user data.

In an embodiment of the disclosure, the user data may be provided at the host computer by executing a host application. The method may further comprise, at the terminal device, executing a client application associated with the host application.

According to a twelfth aspect of the disclosure, there is provided a communication system including a host computer comprising processing circuitry configured to provide user data and a communication interface configured to forward the user data to a cellular network for transmission to a terminal device. The cellular network may comprise a base station having a radio interface and processing circuitry. The base station's processing circuitry may be configured to determine priority information about a first UCI associated with a PUSCH transmission using a configured grant and a second UCI carried by a PUCCH and/or at least one configuration for transmitting at least part of the first and second UCIs. The base station's processing circuitry may be further configured to transmit the priority information and/or the at least one configuration to a terminal device.

In an embodiment of the disclosure, the communication system may further include the base station.

In an embodiment of the disclosure, the communication system may further include the terminal device. The terminal device may be configured to communicate with the base station.

In an embodiment of the disclosure, the processing circuitry of the host computer may be configured to execute a host application, thereby providing the user data. The terminal device may comprise processing circuitry configured to execute a client application associated with the host application.

According to a thirteenth aspect of the disclosure, there is provided a method in a terminal device. The method may comprise receiving at least one configuration. The configuration may indicate transmission of at least one of: at least part of a first UCI associated with a PUSCH transmission using a configured grant, and at least part of a second UCI carried by a PUCCH. The method may further comprise transmitting the at least one of the at least part of the first UCI and at least part of the second UCI based on the configuration. The PUSCH transmission carrying the first UCI and the PUCCH transmission carrying the second UCI may be overlapped. The step of transmitting the at least one of the at least part of the first UCI and at least part of the second UCI based on the configuration may comprise one of the following steps: transmitting the second UCI and skipping the first UCI; and transmitting the first UCI and the second UCI.

In an embodiment of the disclosure, transmitting the second UCI and skipping the first UCI may further comprise transmitting the second UCI on the PUCCH and not transmitting the first UCI.

In an embodiment of the disclosure, transmitting the first UCI and the second UCI may further comprise transmitting the first UCI and the second UCI on the PUSCH using a configured grant.

In an embodiment of the disclosure, the configuration may be carried by a radio resource control (RRC) signaling.

In an embodiment of the disclosure, the method may further comprise determining priority information about the first UCI and the second UCI. The at least one configuration for transmitting at least part of the first and second UCIs may be based on the priority information.

In an embodiment of the disclosure, the priority information may indicate that the second UCI is preconfigured with higher priority than the first UCI.

According to a fourteenth aspect of the disclosure, there is provided a method in a network node. The method may comprise determining at least one configuration. The configuration may indicate transmission of at least one of: at least part of a first UCI associated with a PUSCH transmission using a configured grant, and at least part of a second UCI carried by a PUCCH. The method may further comprise transmitting the configuration to a terminal device. The PUSCH transmission carrying the first UCI and the PUCCH transmission carrying the second UCI may be overlapped. The transmission of at least one of at least part of the first UCI and at least part of the second UCI may comprise one of: transmission of the second UCI and skipping of the first UCI; and transmission of the first UCI and the second UCI.

In an embodiment of the disclosure, the transmission of the second UCI and skipping of the first UCI may further comprise transmission of the second UCI on the PUCCH and no transmission of the first UCI.

In an embodiment of the disclosure, the transmission of the first UCI and the second UCI may further comprise transmission of the first UCI and the second UCI on the PUSCH using a configured grant.

In an embodiment of the disclosure, the configuration may be carried by a RRC signaling.

In an embodiment of the disclosure, the method may further comprise determining priority information about the first UCI and the second UCI. The at least one configuration for transmitting at least part of the first and second UCIs may be based on the priority information.

In an embodiment of the disclosure, the priority information may indicate that the second UCI is preconfigured with higher priority than the first UCI.

According to a fifteenth aspect of the disclosure, there is provided a terminal device. The terminal device may comprise at least one processor and at least one memory. The at least one memory may contain instructions executable by the at least one processor, whereby the terminal device may be operative to receive at least one configuration. The configuration may indicate transmission of at least one of: at least part of a first UCI associated with a PUSCH transmission using a configured grant, and at least part of a second UCI carried by a PUCCH. The terminal device may be further operative to transmit the at least one of the at least part of the first UCI and at least part of the second UCI based on the configuration. The PUSCH transmission carrying the first UCI and the PUCCH transmission carrying the second UCI may be overlapped. The step of transmitting the at least one of the at least part of the first UCI and at least part of the second UCI based on the configuration may comprise one of the following steps: transmitting the second UCI and skipping the first UCI; and transmitting the first UCI and the second UCI.

In an embodiment of the disclosure, the terminal device may be operative to perform the method according to the above fifteenth aspect.

According to a sixteenth aspect of the disclosure, there is provided a network node. The network node may comprise at least one processor and at least one memory. The at least one memory may contain instructions executable by the at least one processor, whereby the network node may be operative to determine at least one configuration. The configuration may indicate transmission of at least one of: at least part of a first UCI associated with a PUSCH transmission using a configured grant, and at least part of a second UCI carried by a PUCCH. The network node may be further operative to transmit the configuration to a terminal device. The PUSCH transmission carrying the first UCI and the PUCCH transmission carrying the second UCI may be overlapped. The transmission of at least one of at least part of the first UCI and at least part of the second UCI may comprise one of: transmission of the second UCI and skipping of the first UCI; and transmission of the first UCI and the second UCI.

In an embodiment of the disclosure, the network node may be operative to perform the method according to the above fourteenth aspect.

According to a seventeenth aspect of the disclosure, there is provided a computer program product. The computer program product may comprise instructions which when executed by at least one processor, cause the at least one processor to perform the method according to any of the above thirteenth and fourteenth aspects.

According to an eighteenth aspect of the disclosure, there is provided a computer readable storage medium. The computer readable storage medium may comprise instructions which when executed by at least one processor, cause the at least one processor to perform the method according to any of the above thirteenth and fourteenth aspects.

According to a nineteenth aspect of the disclosure, there is provided a terminal device. The terminal device may comprise a reception module for receiving at least one configuration. The configuration may indicate transmission of at least one of: at least part of a first UCI associated with a PUSCH transmission using a configured grant, and at least part of a second UCI carried by a PUCCH. The terminal device may further comprise a transmission module for transmitting the at least one of the at least part of the first UCI and at least part of the second UCI based on the configuration. The PUSCH transmission carrying the first UCI and the PUCCH transmission carrying the second UCI may be overlapped. Transmitting the at least one of the at least part of the first UCI and at least part of the second UCI based on the configuration may comprise one of: transmitting the second UCI and skipping the first UCI; and transmitting the first UCI and the second UCI.

According to a twentieth aspect of the disclosure, there is provided a network node. The network node may comprise a determination module for determining at least one configuration. The configuration may indicate transmission of at least one of: at least part of a first UCI associated with a PUSCH transmission using a configured grant, and at least part of a second UCI carried by a PUCCH. The network node may further comprise a transmission module for transmitting the configuration to a terminal device. The PUSCH transmission carrying the first UCI and the PUCCH transmission carrying the second UCI may be overlapped. The transmission of at least one of at least part of the first UCI and at least part of the second UCI may comprise one of: transmission of the second UCI and skipping of the first UCI; and transmission of the first UCI and the second UCI.

According to a twenty-first aspect of the disclosure, there is provided a method implemented in a communication system including a network node and a terminal device. The method may comprise, at the network node, determining at least one configuration. The configuration may indicate transmission of at least one of: at least part of a first UCI associated with a PUSCH transmission using a configured grant, and at least part of a second UCI carried by a PUCCH. The method may further comprise, at the network node, transmitting the configuration to a terminal device. The method may further comprise, at the terminal device, receiving the at least one configuration. The method may further comprise, at the terminal device, transmitting the at least one of the at least part of the first UCI and at least part of the second UCI based on the configuration. The PUSCH transmission carrying the first UCI and the PUCCH transmission carrying the second UCI may be overlapped. The step of transmitting the at least one of the at least part of the first UCI and at least part of the second UCI based on the configuration may comprise one of the following steps: transmitting the second UCI and skipping the first UCI; and transmitting the first UCI and the second UCI.

According to a twenty-second aspect of the disclosure, there is provided a communication system. The communication system may comprise a network node configured to determine at least one configuration. The configuration may indicate transmission of at least one of: at least part of a first UCI associated with a PUSCH transmission using a configured grant, and at least part of a second UCI carried by a PUCCH. The network node may be further configured to transmit the configuration to a terminal device. The communication system may further comprise the terminal device configured to receive the at least one configuration and transmit the at least one of the at least part of the first UCI and at least part of the second UCI based on the configuration. The PUSCH transmission carrying the first UCI and the PUCCH transmission carrying the second UCI may be overlapped. Transmitting the at least one of the at least part of the first UCI and at least part of the second UCI based on the configuration may comprise one of: transmitting the second UCI and skipping the first UCI; and transmitting the first UCI and the second UCI.

According to a twenty-third aspect of the disclosure, there is provided a method implemented in a communication system including a network node and a terminal device. The method may comprise, at the network node, determining priority information about a first UCI associated with a PUSCH transmission using a configured grant and a second UCI carried by a PUCCH and/or at least one configuration for transmitting at least part of the first and second UCIs. The method may further comprise, at the network node, transmitting the priority information and/or the at least one configuration to a terminal device. The method may further comprise, at the terminal device, determining the priority information about the first UCI associated with a PUSCH transmission using a configured grant and the second UCI carried by a PUCCH. The method may further comprise, at the terminal device, transmitting at least part of the first and second UCIs based on the determined priority information.

According to a twenty-fourth aspect of the disclosure, there is provided a communication system. The communication system may comprise a network node configured to: determine priority information about a first UCI associated with a PUSCH transmission using a configured grant and a second UCI carried by a PUCCH and/or at least one configuration for transmitting at least part of the first and second UCIs; and transmit the priority information and/or the at least one configuration to a terminal device. The communication system may further comprise the terminal device configured to: determine the priority information about the first UCI associated with a PUSCH transmission using a configured grant and the second UCI carried by a PUCCH; and transmit at least part of the first and second UCIs based on the determined priority information.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

For a node (e.g., NR-U gNB/UE, LTE-LAA eNB/UE, or Wi-Fi access point (AP)/station (STA)) to be allowed to transmit in unlicensed spectrum (e.g., 5 GHz band), it typically needs to perform a clear channel assessment (CCA). This procedure typically includes sensing the medium to be idle for a number of time intervals. Sensing the medium to be idle can be done in different ways, e.g. using energy detection, preamble detection or using virtual carrier sensing. The latter implies that the node reads control information from other transmitting nodes informing when a transmission ends. After sensing the medium to be idle, the node is typically allowed to transmit for a certain amount of time, sometimes referred to as transmission opportunity (TXOP). The length of the TXOP depends on regulation and type of CCA that has been performed, but typically ranges from 1 ms to 10 ms. This duration is often referred to as Channel Occupancy Time (COT).

In Wi-Fi, feedback of data reception acknowledgements (ACKs) is transmitted without performing clear channel assessment. Preceding feedback transmission, a small time duration (called SIFS) is introduced between the data transmission and the corresponding feedback which does not include actual sensing of the channel. In 802.11, the SIFS period (16 μs for 5 GHz orthogonal frequency division multiplexing (OFDM) PHYs) is defined as:

$$aSIFSTime=aRxPHYDelay+aMACProcessingDelay+aRxTxTurnaroundTime,$$

where aRxPHYDelay defines the duration needed by the physical (PHY) layer to deliver a packet to the MAC layer, aMACProcessingDelay defines the duration that the MAC layer needs to trigger the PHY layer transmitting a response, and aRxTxTurnaroundTime defines the duration needed to turn the radio from reception into transmission mode. Therefore, the SIFS duration is used to accommodate for the hardware delay to switch the direction from reception to transmission.

Figure 1:
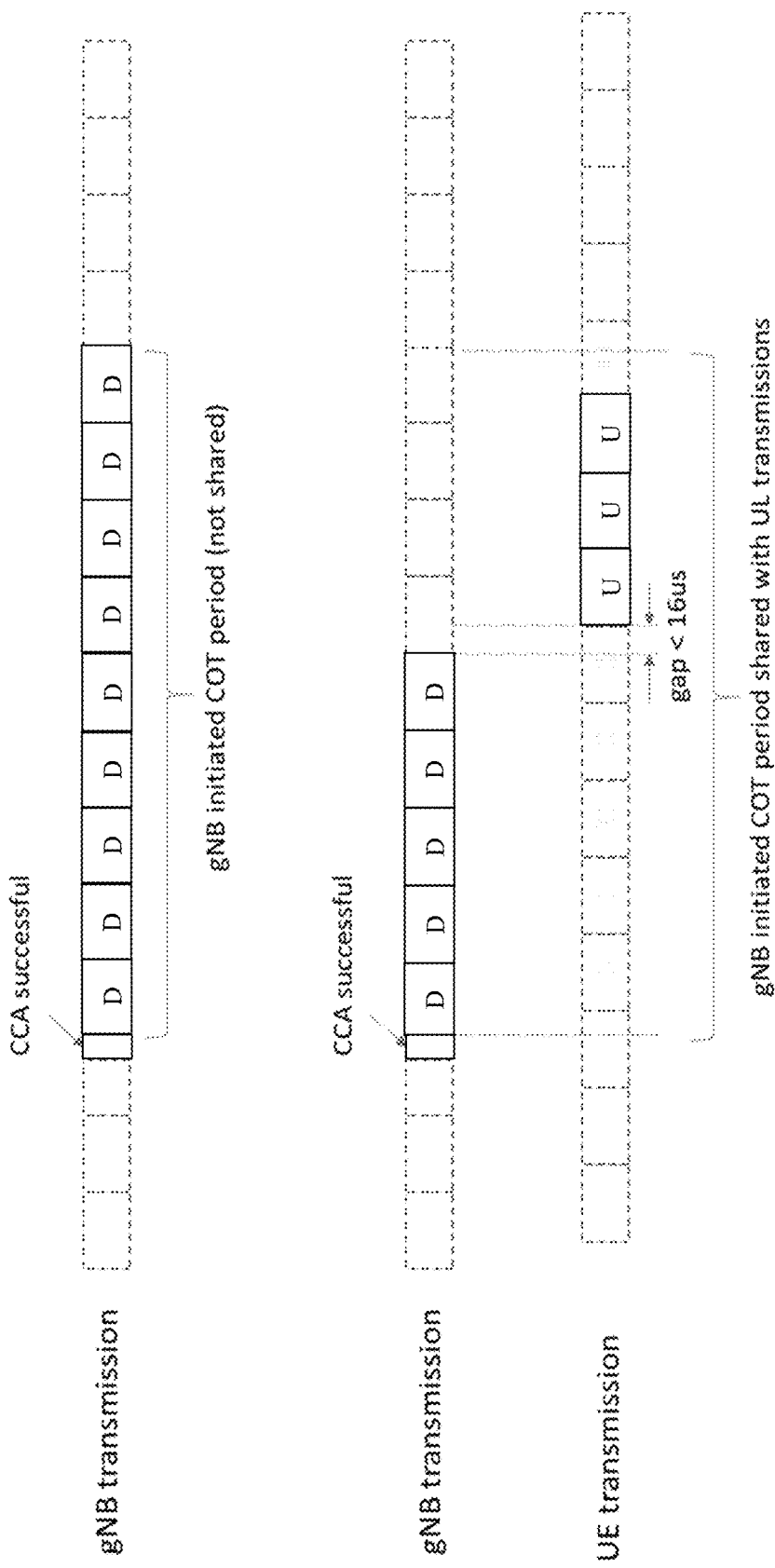
FIG. 1 illustrates an example for transmission opportunities with and without COT sharing.
Figure 2:
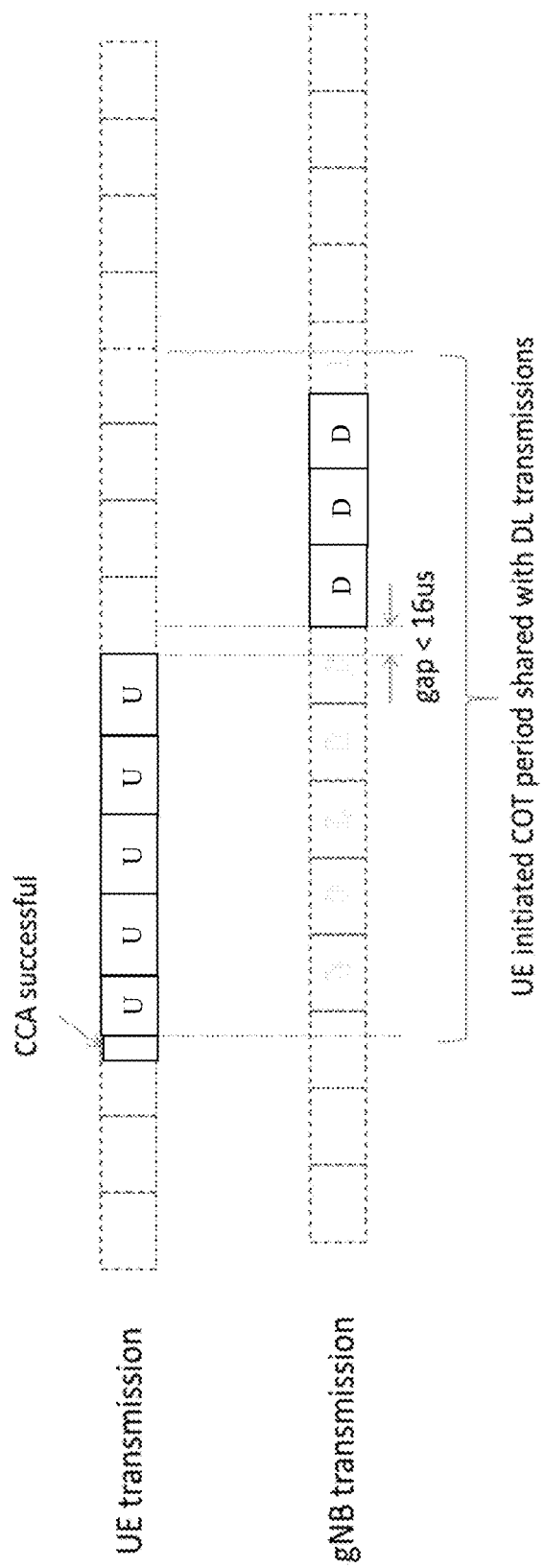
FIG. 2 illustrates another example for COT sharing.

It is anticipated that for NR in unlicensed bands (NR-U), a similar gap to accommodate for the radio turnaround time will be allowed. For example, this will enable the transmission of PUCCH carrying UCI feedback as well as PUSCH carrying data and possible UCI within the same transmit opportunity (TXOP) acquired by the initiating gNB without the UE performing clear channel assessment before PUSCH/PUCCH transmission as long as the gap between downlink (DL) and uplink (UL) transmission is less than or equal to 16 μs. Operation in this manner is typically called "COT sharing." An example on COT sharing is illustrated in FIG. 1. It shows TXOP both with and without COT sharing where CCA is performed by the initiating node (gNB). For the case of COT sharing, the gap between DL and UL transmission is less than 16 μs. FIG. 2 illustrates an example on a UE COT sharing with the DL transmission. For the case of COT sharing, the gap between UL and DL transmission is less than 16 us.

Listen-before-talk (LBT) is designed for unlicensed spectrum co-existence with other RATs. In this mechanism, a radio device applies a clear channel assessment (CCA) check (i.e. channel sensing) before any transmission. The transmitter involves energy detection (ED) over a time period compared to a certain energy detection threshold (ED threshold) in order to determine if a channel is idle. In case the channel is determined to be occupied, the transmitter performs a random back-off within a contention window before next CCA attempt. In order to protect the ACK transmissions, the transmitter must defer a period after each busy CCA slot prior to resuming back-off. As soon as the transmitter has grasped access to a channel, the transmitter is only allowed to perform transmission up to a maximum time duration (namely, the maximum channel occupancy time (MCOT)). For QoS differentiation, a channel access priority based on the service type has been defined. For example, there are four LBT priority classes defined for differentiation of channel access priorities between services using contention window size (CWS) and MCOT duration.

As described in 3GPP technical report (TR) 38.889 V16.0.0, the channel access schemes for NR-based access for unlicensed spectrum can be classified into the following categories. Category 1 is Immediate transmission after a short switching gap. This is used for a transmitter to immediately transmit after a UL/DL switching gap inside a COT. The switching gap from reception to transmission is to accommodate the transceiver turnaround time and is no longer than 16 μs. Category 2 is LBT without random back-off. The duration of time that the channel is sensed to be idle before the transmitting entity transmits is deterministic.

Category 3 is LBT with random back-off with a contention window of fixed size. The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel.

Category 4 is LBT with random back-off with a contention window of variable size. The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel. For different transmissions in a COT and different channels/signals to be transmitted, different categories of channel access schemes can be used.

There may be some parameters in UCI: HARQ ID, NDI, RV, COT sharing information, and some additional information may also be included. Following parameters may be included in configured grant (CG)-UCI: details on COT sharing information such as LBT Priority class value (channel access agenda), Remaining COT duration and Signaling indicator for enabling/disabling COT sharing; UE-ID; CRC; PUSCH start and end point/slot; Resource configuration index; Starting position of a transmitted PUSCH; MCS/TBS, if enhancement on link adaptation is supported; CBGTI, if CBG based retransmission on configured grant resources is supported.

Based on above, a UE would include above information in a CG-UCI for a transmission with a configured grant. However, it may occur that both PUCCH-UCI and CG-UCI are triggered in the same time. The former can be triggered by either of below conditions: 1) HAQR A/N for reception of DL data; 2) CSI report; 3) scheduling request (SR) due to arrival of new data. In case the UE accommodates both UCIs on the same PUSCH, there may be too much control overhead so that the data transmission may be negatively impacted. Therefore, it would be advantageous to fix the issues when both UCIs are triggered and being overlapped in time.

The present disclosure proposes an improved solution for uplink transmission. The solution may be applied to a wireless communication system including a terminal device and a network node such as a base station or any other node with similar functionality. The terminal device can communicate through a radio access communication link with the base station. The base station can provide radio access communication links to terminal devices that are within its communication service cell. Note that the communications may be performed between the terminal device and the base station according to any suitable communication standards and protocols. The terminal device may also be referred to as, for example, device, access terminal, user equipment (UE), mobile station, mobile unit, subscriber station, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

Now, several embodiments will be described to explain the improved solution for uplink transmission. The basic idea is to introduce a collision handling mechanism for handling collision between the associated CG-UCI (or plus the corresponding PUSCH transmission) and PUCCH-UCI. Note that the collision between the two UCIs can also be defined as the collision between the transmission for the PUSCH carrying the first UCI and the transmission of the second UCI carried by PUCCH. Because the gNB relies on the first UCI carried in the PUSCH using a configured grant to decode the PUSCH, the first UCI and the PUSCH are multiplexed in the same PUSCH transmission.

Although these embodiments will be described in the context of NR-U, the principle of the disclosure is also applicable to other unlicensed operation scenarios (e.g. LTE LAA/eLAA/feLAA/MuLteFire) and licensed operation scenarios where, for example, one UCI for a configured grant transmission and the other UCI for a dynamically scheduled DL transmission are triggered and being overlapped in the time.

As a first embodiment, a collision handling mechanism is introduced. The UE may determine a priority level for each UCI in terms of at least one of conditions:
1) The priority of LCHs/logical channel groups (LCGs) that are associated with the UCI;
2) Latency budget or transmission reliability requirement of the data associated with the UCI;
3) a predefined priority between CG-UCI (and the corresponding PUSCH using configured grant) and PUCCH UCI;
4) The information content in the UCI.

For the first aspect, the LCH priority levels (such as 5QI in 5G network, or QCI in 4G network) is associated with the transmitted data for which the UCI is generated, i.e., the data activity of those LCHs has triggered the UCI. If the UCI transmitted using configured grant has a higher priority than the data transmitted in DL using PDSCH, the CG-UCI may be prioritized by the UE. Otherwise, the PUCCH UCI may be prioritized over the CG-UCI. As another option, the relative priorities between UL and DL LCHs can be predefined or preconfigured.

For the second aspect, the UE may consider what is the latency budget left for the data in order to fulfill certain latency target. If the uplink data is close to delay budget, the PUSCH transmission using configured grant and the associated CG-UCI may be prioritized than PUCCH UCI for DL HARQ transmission. Otherwise, PUCCH UCI for DL HARQ transmission may be prioritized than the PUSCH using configured grant and the associated CG-UCI. As a simple option, the UE may determine the priority of the PUSCH and CG-UCI based on the queuing delay of the data to be transmitted. If the queuing delay is larger than a preconfigured threshold, the PUSCH and the associated CG-UCI may be prioritized than PUCCH UCI for DL HARQ transmission. The UE may also consider what is the requirement of transmission reliability for the associated data. The priority of the CG-UCI may also be determined based on the corresponding PUSCH transmission priority.

For the third aspect, in one example, CG-UCI and the corresponding PUSCH may be preconfigured with higher priority than PUCCH-UCI, because the UL grant has to be skipped if the CG-UCI is not transmitted. In another example, PUCCH-UCI may be preconfigured with higher priority than PUSCH using configured grant and the associated CG-UCI, when PUCCH-UCI contains HARQ A/N at the last chance (e.g., the UE has received a DCI carrying a maximum K2 value). Without receiving such information, there can be an residual HARQ transmission failure for the data block.

The priority level may be considered for handling the collision between CG-UCI and PUCCH-UCI.

As a second embodiment, based on the determined priority, the UE may be configured to take at least one of below actions, for example:

1) Option 1: transmit PUCCH-UCI in another serving cell if PUCCH resources are available in this serving cell, wherein this serving cell may belong to a same or different PUCCH cell group with the cell that has triggered the PUCCH-UCI.

2) Option 2: Move PUCCH-UCI to any other serving cell, if there is no any other cell configured with available PUCCH resource for transmission of this PUCCH-UCI. The UE may trigger a random access (RA) on that cell. The UCI may be transmitted in a RA message. The gNB may configure PUCCH resource for the UE in that cell upon reception of RA. In this case, the UCI may be transmitted on obtained PUCCH resource after the RA procedure.

3) Option 3: skip or delay transmission for the UCI with lower priority. In this way, UCI information with higher priority is served first given limited space on PUSCH transmission. In case CG-UCI is skipped, meaning that the configured grant is skipped, PUCCH-UCI is transmitted on PUCCH channel. That is, when the CG-UCI is lower prioritized than the second UCI and not transmitted, the configured grant for the PUSCH comprising the first UCI is skipped.

4) Option 4: enabling simultaneous transmission for PUCCH and PUSCH using configured grant for the cell.

5) Option 5: merging both UCIs into a new UCI, and transmitting it on the PUSCH using configured grant. During merging procedure, some low priority information fields may be dropped due to limited room for UCI. The merged content format may be configured by the gNB. For instance, the CSI can be lower prioritized than the HARQ process ID, RVI and UE ID.

The configuration of any one or more of the above options may be signaled by the gNB to a UE via a RRC message, system information, a MAC CE, or L1/L2 control signaling.

As a third embodiment, the PUCCH UCI is discarded when there is not HARQ NACK carried and only PUSCH using configured grant and the associated CG-UCI is transmitted. Otherwise, the PUCCH UCI is transmitted and the UL grant is skipped (i.e. PUSCH using configured grant and the associated CG-UCI are not transmitted).

As a fourth embodiment, the relative priority between PUSCH using configured grant and the PUCCH UCI can be preconfigured by the network. When the UE has been configured with multiple PUCCH resources and/or CG grants of different CG configurations in a cell/BWP, the relative priority can be configured per PUCCH resource and SR configuration pair. In an example, the network can include the configuration in SR configuration, cell configuration or cell group configuration using dedicated RRC signaling. In another example, the network can configure the relative priority using MAC CE.

As a fifth embodiment, the PUCCH UCI may be carried as a sub MAC PDU in the MAC PDU mapped into the PUSCH using configured grant. For one instance, a new MAC CE is defined to carry the PUCCH UCI. The sub MAC PDU can be in the front position of the MAC PDU so that the gNB can decode the PUCCH early.

As a sixth embodiment, the function of collision handling may be configured per cell/carrier/BWP/channel/subband. Different handling options may be configured for different serving cell/carrier/BWP/channel/subband.

Figure 3:
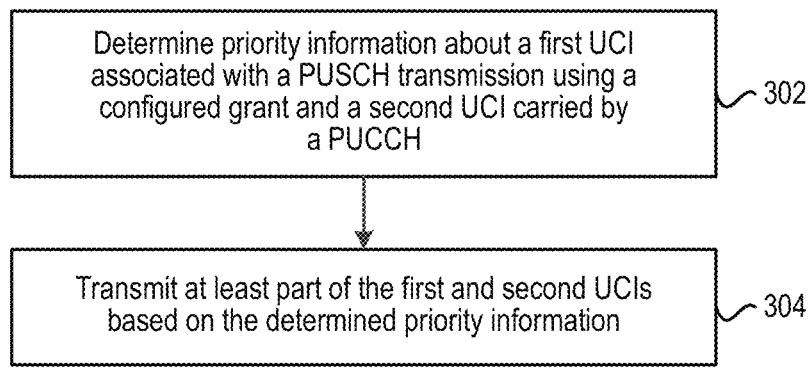
FIG. 3 is a flowchart illustrating a method implemented at a terminal device according to an embodiment of the disclosure.

Hereinafter, the solution will be further described with reference to FIGS. 3-13. FIG. 3 is a flowchart illustrating a method implemented at a terminal device according to an embodiment of the disclosure. At block 302, the terminal device determines priority information about a first UCI associated with a PUSCH transmission using a configured grant and a second UCI carried by a PUCCH. The PUSCH transmission carrying the first UCI and the PUCCH transmission carrying the second UCI may be overlapped in time. The priority information may comprise a first priority for the first UCI and a second priority for the second UCI. Alternatively, the priority information may comprise a relative priority between the first and second UCIs.

For example, the following options may be used to determine the priority information. As the first option, the priority information may be determined based at least on a priority of at least one logical channel associated with each of the first and second UCIs. The priority of the at least one logical channel associated with each of the first and second UCIs may be determined based on one of: a priority of data of the at least one logical channel for which each of the first and second UCIs is generated; and a predefined relative priority between at least one uplink logical channel associated with the first UCI and at least one downlink logical channel associated with the second UCI.

As the second option, the priority information may be determined based at least on a latency budget of data associated with each of the first and second UCIs. For example, the determined priority information may indicate that the first UCI is prioritized over the second UCI in response to one or more of followings: remaining latency budget of uplink data associated with the first UCI is smaller than a first predetermined threshold; and a queuing delay of uplink data associated with the first UCI is larger than a second predetermined threshold.

As the third option, the priority information may be determined based at least on a transmission reliability requirement of data associated with each of the first and second UCIs. As the fourth option, the priority information may be determined based at least on a predefined or pre-configured relative priority between the first and second UCIs. For example, the first UCI may be predefined or preconfigured to have a higher priority than the second UCI which does not carry HARQ NACK. As a fifth option, the first priority for the first UCI may be determined based on the corresponding PUSCH transmission priority. Note that any one of the above first to fifth options may be used alone or in combination.

Optionally, the terminal device may be configured with multiple PUCCH resources and/or configured grants of multiple configured scheduling configurations. In this case, corresponding priority information may be preconfigured in the terminal device for each pair of a PUCCH resource and a configured scheduling configuration.

At block 304, the terminal device transmits at least part of the first and second UCIs based on the determined priority information. In this way, the collision between the two UCIs can be handled properly. The at least part of the first and second UCIs may be one of: the first UCI; the second UCI; the first UCI and the second UCI; the first UCI and part of the second UCI which are merged as one UCI; the second UCI and part of the first UCI which are merged as one UCI; and part of the first UCI and part of the second UCI which are merged as one UCI.

If the priority information indicates that the first UCI has a higher priority than the second UCI, the transmission at block 304 may comprise one or more of: transmitting the second UCI in a PUCCH cell which is different than current PUCCH cell; transmitting the second UCI through random access in a cell which is different than current cell triggering the second UCI; transmitting only the first UCI; transmitting the first and second UCIs in this order with a delay between the two transmissions; and transmitting, as one merged UCI, at least part of the first UCI and at least part of the second UCI. For example, one or more fields in the first and/or second UCI with lower priorities may be removed from the one merged UCI.

On the other hand, if the priority information indicates that the second UCI has a higher priority than the first UCI, the transmission at block 304 may comprise one or more of: transmitting only the second UCI; transmitting the second and first UCIs in this order with a delay between the two transmissions; simultaneously transmitting the second UCI and PUSCH using the configured grant; and transmitting, as one merged UCI, at least part of the first UCI and at least part of the second UCI. Note that when the first UCI is lower prioritized than the second UCI and not transmitted, the configured grant for the PUSCH comprising the first UCI may be skipped.

In a case that the second UCI is transmitted, the second UCI may be carried as a sub MAC PDU in an MAC PDU mapped into a PUSCH using the configured grant. The sub MAC PDU may be disposed in a front position of the MAC PDU. In this way, the base station can decode the PUCCH early. For example, the sub MAC PDU may be a (e.g. newly defined) MAC CE.

Optionally, the determining at block 302 and the transmitting at block 304 may be performed in a same way or differently for different cell/carrier/bandwidth part/channel/subband.

Figure 4:
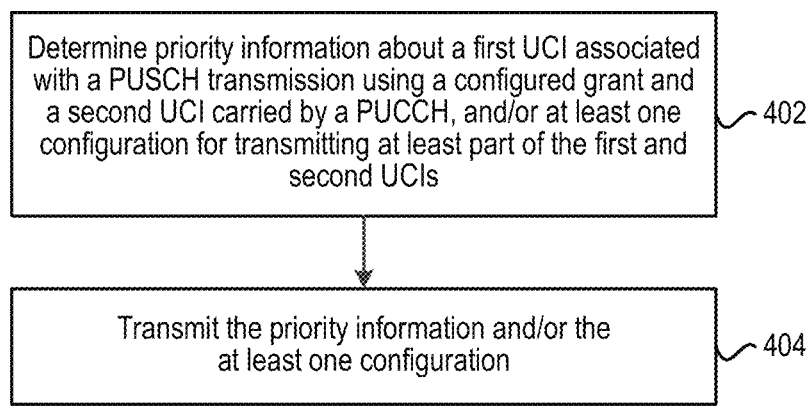
FIG. 4 is a flowchart illustrating a method implemented at a network node according to an embodiment of the disclosure.

FIG. 4 is a flowchart illustrating a method implemented at a network node according to an embodiment of the disclosure. The network node may be a base station or any other node with similar functionality. At block 402, the network node determines priority information about a first UCI associated with a PUSCH transmission using a configured grant and a second UCI carried by a PUCCH, and/or at least one configuration for transmitting at least part of the first and second UCIs. At block 404, the network node transmits the priority information and/or the at least one configuration.

The priority information may comprise at least one relative priority between the first and second UCIs. Alternatively, the priority information may comprise at least one group of a first priority for the first UCI and a second priority for the second UCI. Optionally, the number of the at least one relative priority or the at least one group may be more than one. Each of the more than one relative priorities or the more than one groups may correspond to a pair of a PUCCH resource and a configured scheduling configuration.

Optionally, the priority information may comprise relative priorities between different fields contained in the first and second UCIs. Optionally, the priority information and/or the at least one configuration may be the same or different for different cell/carrier/bandwidth part/channel/subband.

In case the priority information indicates that the first UCI has a higher priority than the second UCI, the at least one configuration for transmitting at least part of the first and second UCIs may comprise one or more of: transmitting the second UCI in a PUCCH cell which is different than current PUCCH cell; transmitting the second UCI through random access in a cell which is different than current cell triggering the second UCI; transmitting only the first UCI; transmitting the first and second UCIs in this order with a delay between the two transmissions; and transmitting, as one merged UCI, at least part of the first UCI and at least part of the second UCI.

On the other hand, in case the priority information indicates that the second UCI has a higher priority than the first UCI, the at least one configuration for transmitting at least part of the first and second UCIs may comprise one or more of: transmitting only the second UCI; transmitting the second and first UCIs in this order with a delay between the two transmissions; simultaneously transmitting the second UCI and PUSCH using the configured grant; and transmitting, as one merged UCI, at least part of the first UCI and at least part of the second UCI. It should be also noted that two blocks shown in succession in the figures may, in fact, be executed substantially concurrently, or the blocks may sometimes be executed in the reverse order, depending upon the functionality involved.

Based on the above description, at least one aspect of the present disclosure provides a method implemented in a communication system including a network node and a terminal device. The method may comprise, at the network node, determining priority information about a first UCI associated with a PUSCH transmission using a configured grant and a second UCI carried by a PUCCH and/or at least one configuration for transmitting at least part of the first and second UCIs. The method may further comprise, at the network node, transmitting the priority information and/or the at least one configuration to a terminal device. The method may further comprise, at the terminal device, determining the priority information about the first UCI associated with a PUSCH transmission using a configured grant and the second UCI carried by a PUCCH. The method may further comprise, at the terminal device, transmitting at least part of the first and second UCIs based on the determined priority information.

Figure 5:
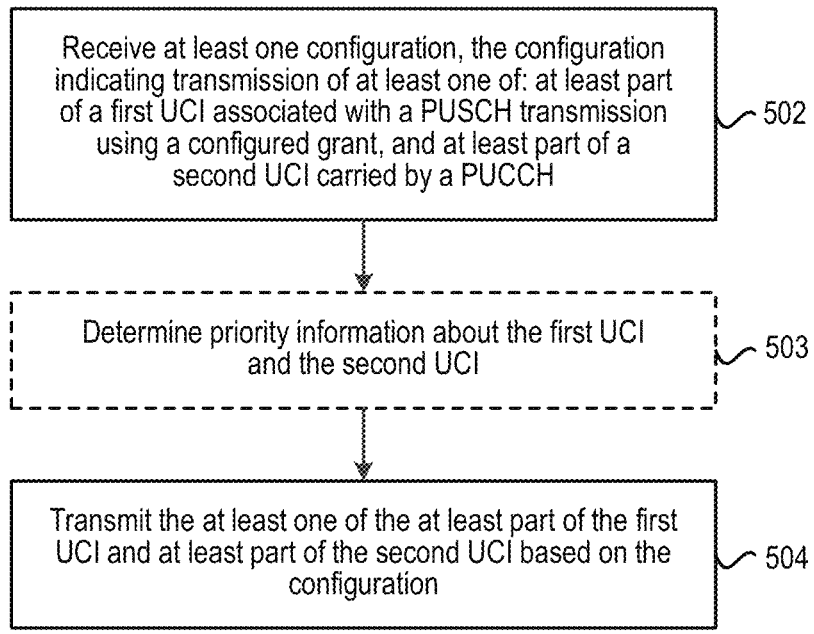
FIG. 5 is a flowchart illustrating a method implemented at a terminal device according to an embodiment of the disclosure.

FIG. 5 is a flowchart illustrating a method implemented at a terminal device according to an embodiment of the disclosure. At block 502, the terminal device receives at least one configuration. The configuration indicates transmission of at least one of: at least part of a first UCI associated with a PUSCH transmission using a configured grant, and at least part of a second UCI carried by a PUCCH. The PUSCH transmission carrying the first UCI and the PUCCH transmission carrying the second UCI are overlapped. As described above with respect to the second embodiment, the configuration of any one or more of option 1 to option 5 may be signaled by a network node to the terminal device via a RRC signaling.

At block 504, the terminal device transmits the at least one of the at least part of the first UCI and at least part of the second UCI based on the configuration. As an option, the terminal device may transmit the second UCI and skipping the first UCI, as described above with respect to option 3 of the second embodiment. For example, the terminal device may transmit the second UCI on the PUCCH and may not transmit the first UCI. As another option, the terminal device may transmit the first UCI and the second UCI, as described above with respect to option 5 of the second embodiment. For example, the terminal device may transmit the first UCI and the second UCI on the PUSCH using a configured grant.

Optionally, the terminal device may determine priority information about the first UCI and the second UCI at block 503. The at least one configuration for transmitting at least part of the first and second UCIs may be based on the priority information. As described above with respect to the third aspect of the first embodiment, the priority information may indicate that the second UCI is preconfigured with higher priority than the first UCI.

Figure 6:
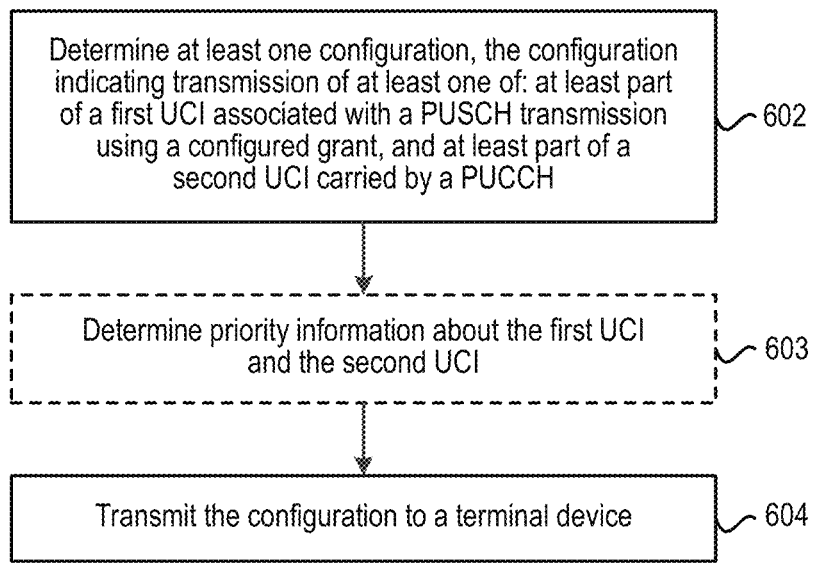
FIG. 6 is a flowchart illustrating a method implemented at a network node according to an embodiment of the disclosure.

FIG. 6 is a flowchart illustrating a method implemented at a network node according to an embodiment of the disclosure. The network node may be a base station or any other node with similar functionality. At block 602, the network node determines at least one configuration. The configuration indicates transmission of at least one of: at least part of a first UCI associated with a PUSCH transmission using a configured grant, and at least part of a second UCI carried by a PUCCH. The PUSCH transmission carrying the first UCI and the PUCCH transmission carrying the second UCI are overlapped. As described above with respect to block 502, the transmission of at least one of at least part of the first UCI and at least part of the second UCI may comprise one of: transmission of the second UCI and skipping of the first UCI; and transmission of the first UCI and the second UCI. For example, the transmission of the second UCI and skipping of the first UCI may comprise transmission of the second UCI on the PUCCH and no transmission of the first UCI. The transmission of the first UCI and the second UCI may comprise transmission of the first UCI and the second UCI on the PUSCH using a configured grant. At block 604, the network node transmits the configuration to a terminal device. Optionally, the network node determines priority information about the first UCI and the second UCI at block 603. The at least one configuration for transmitting at least part of the first and second UCIs may be based on the priority information. For example, the priority information may indicate that the second UCI is preconfigured with higher priority than the first UCI.

Based on the above description, at least one aspect of the present disclosure provides a method implemented in a communication system including a network node and a terminal device. The method may comprise, at the network node, determining at least one configuration. The configuration may indicate transmission of at least one of: at least part of a first UCI associated with a PUSCH transmission using a configured grant, and at least part of a second UCI carried by a PUCCH. The method may further comprise, at the network node, transmitting the configuration to a terminal device. The method may further comprise, at the terminal device, receiving the at least one configuration. The method may further comprise, at the terminal device, transmitting the at least one of the at least part of the first UCI and at least part of the second UCI based on the configuration. The PUSCH transmission carrying the first UCI and the PUCCH transmission carrying the second UCI may be overlapped. The step of transmitting the at least one of the at least part of the first UCI and at least part of the second UCI based on the configuration may comprise one of the following steps: transmitting the second UCI and skipping the first UCI; and transmitting the first UCI and the second UCI.

Figure 7:
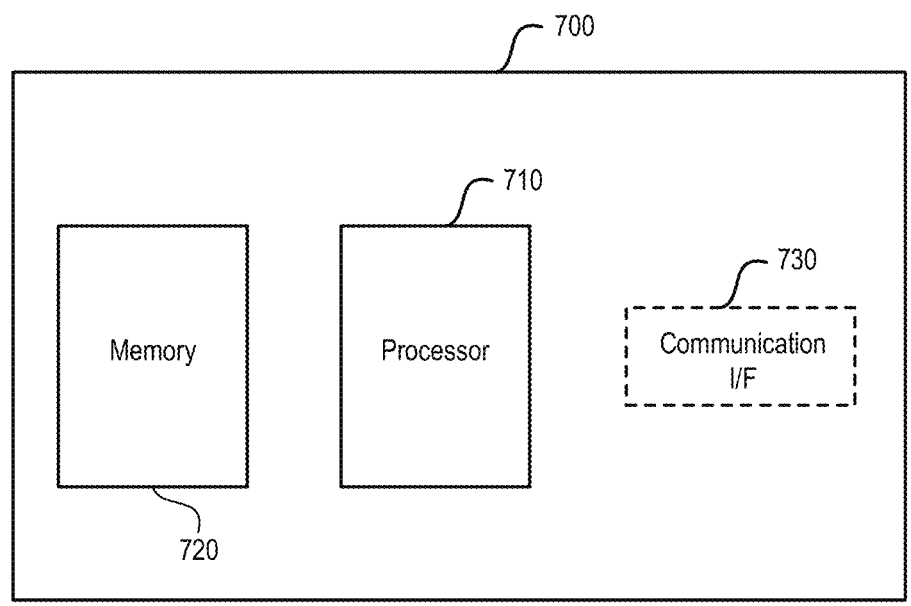
FIG. 7 is a block diagram showing an apparatus suitable for use in practicing some embodiments of the disclosure.

FIG. 7 is a block diagram showing an apparatus suitable for use in practicing some embodiments of the disclosure. For example, any one of the terminal device and the network node described above may be implemented through the apparatus 700. As shown, the apparatus 700 may include a processor 710, a memory 720 that stores a program, and optionally a communication interface 730 for communicating data with other external devices through wired and/or wireless communication.

The program includes program instructions that, when executed by the processor 710, enable the apparatus 700 to operate in accordance with the embodiments of the present disclosure, as discussed above. That is, the embodiments of the present disclosure may be implemented at least in part by computer software executable by the processor 710, or by hardware, or by a combination of software and hardware.

The memory 720 may be of any type suitable to the local technical environment and may be implemented using any suitable data storage technology, such as semiconductor based memory devices, flash memories, magnetic memory devices and systems, optical memory devices and systems, fixed memories and removable memories. The processor 710 may be of any type suitable to the local technical environment, and may include one or more of general purpose computers, special purpose computers, microprocessors, digital signal processors (DSPs) and processors based on multi-core processor architectures, as non-limiting examples.

Figure 8:
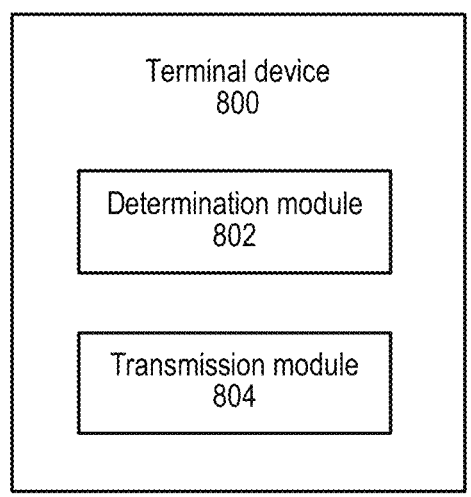
FIG. 8 is a block diagram showing a terminal device according to an embodiment of the disclosure.

FIG. 8 is a block diagram showing a terminal device according to an embodiment of the disclosure. As shown, the terminal device 800 comprises a determination module 802 and a transmission module 804. The determination module 802 may be configured to determine priority information about a first UCI associated with a PUSCH transmission using a configured grant and a second UCI carried by a PUCCH, as described above with respect to block 302. The transmission module 804 may be configured to transmit at least part of the first and second UCIs based on the determined priority information, as described above with respect to block 304.

Figure 9:
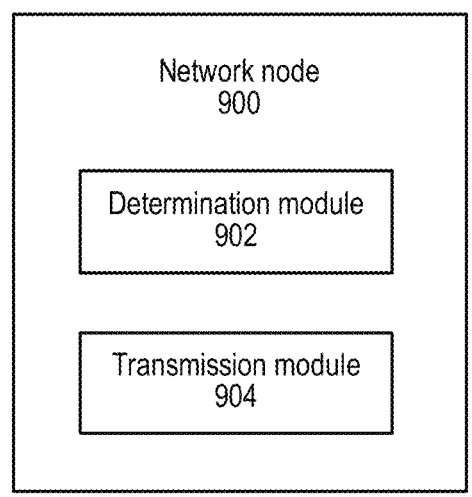
FIG. 9 is a block diagram showing a network node according to an embodiment of the disclosure.

FIG. 9 is a block diagram showing a network node according to an embodiment of the disclosure. As shown, the network node 900 comprises a determination module 902 and a transmission module 904. The determination module 902 may be configured to determine priority information about a first UCI associated with a PUSCH transmission using a configured grant and a second UCI carried by a PUCCH and/or at least one configuration for transmitting at least part of the first and second UCIs, as described above with respect to block 402. The transmission module 904 may be configured to transmit the priority information and/or the at least one configuration, as described above with respect to block 404.

Based on the above description, at least one aspect of the present disclosure provides a communication system. The communication system may comprise a network node configured to: determine priority information about a first UCI associated with a PUSCH transmission using a configured grant and a second UCI carried by a PUCCH and/or at least one configuration for transmitting at least part of the first and second UCIs; and transmit the priority information and/or the at least one configuration to a terminal device. The communication system may further comprise the terminal device configured to: determine the priority information about the first UCI associated with a PUSCH transmission using a configured grant and the second UCI carried by a PUCCH; and transmit at least part of the first and second UCIs based on the determined priority information.

Figure 10:
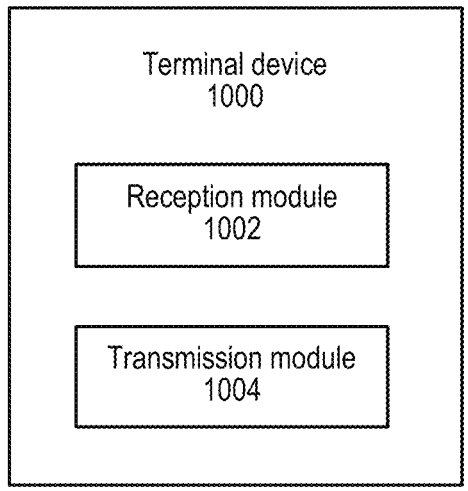
FIG. 10 is a block diagram showing a terminal device according to an embodiment of the disclosure.

FIG. 10 is a block diagram showing a terminal device according to an embodiment of the disclosure. As shown, the terminal device 1000 comprises a reception module 1002 and a transmission module 1004. The reception module 1002 may be configured to receive at least one configuration, as described above with respect to block 502. The configuration may indicate transmission of at least one of: at least part of a first UCI associated with a PUSCH transmission using a configured grant, and at least part of a second UCI carried by a PUCCH. The transmission module 1004 may be configured to transmit the at least one of the at least part of the first UCI and at least part of the second UCI based on the configuration, as described above with respect to block 504. The PUSCH transmission carrying the first UCI and the PUCCH transmission carrying the second UCI may be overlapped. Transmitting the at least one of the at least part of the first UCI and at least part of the second UCI based on the configuration may comprise one of: transmitting the second UCI and skipping the first UCI; and transmitting the first UCI and the second UCI.

Figure 11:
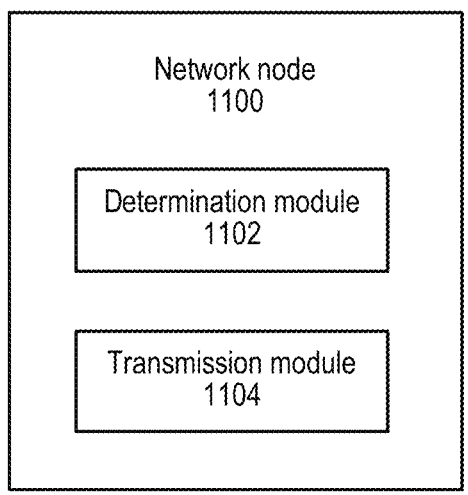
FIG. 11 is a block diagram showing a network node according to an embodiment of the disclosure.

FIG. 11 is a block diagram showing a network node according to an embodiment of the disclosure. As shown, the network node 1100 comprises a determination module 1102 and a transmission module 1104. The determination module 1102 may be configured to determine at least one configuration, as described above with respect to block 602. The configuration may indicate transmission of at least one of: at least part of a first UCI associated with a PUSCH transmission using a configured grant, and at least part of a second UCI carried by a PUCCH. The transmission module 1104 may be configured to transmit the configuration to a terminal device, as described above with respect to block 604. The PUSCH transmission carrying the first UCI and the PUCCH transmission carrying the second UCI may be overlapped. The transmission of at least one of at least part of the first UCI and at least part of the second UCI may comprise one of: transmission of the second UCI and skipping of the first UCI; and transmission of the first UCI and the second UCI. The modules described above may be implemented by hardware, or software, or a combination of both.

Based on the above description, at least one aspect of the present disclosure provides a communication system. The communication system may comprise a network node configured to determine at least one configuration. The configuration may indicate transmission of at least one of: at least part of a first UCI associated with a PUSCH transmission using a configured grant and at least part of a second UCI carried by a PUCCH. The network node may be further configured to transmit the configuration to a terminal device. The communication system may further comprise the terminal device configured to receive the at least one configuration and transmit the at least one of the at least part of the first UCI and at least part of the second UCI based on the configuration. The PUSCH transmission carrying the first UCI and the PUCCH transmission carrying the second UCI may be overlapped. Transmitting the at least one of the at least part of the first UCI and at least part of the second UCI based on the configuration may comprise one of: transmitting the second UCI and skipping the first UCI; and transmitting the first UCI and the second UCI.

Figure 12:
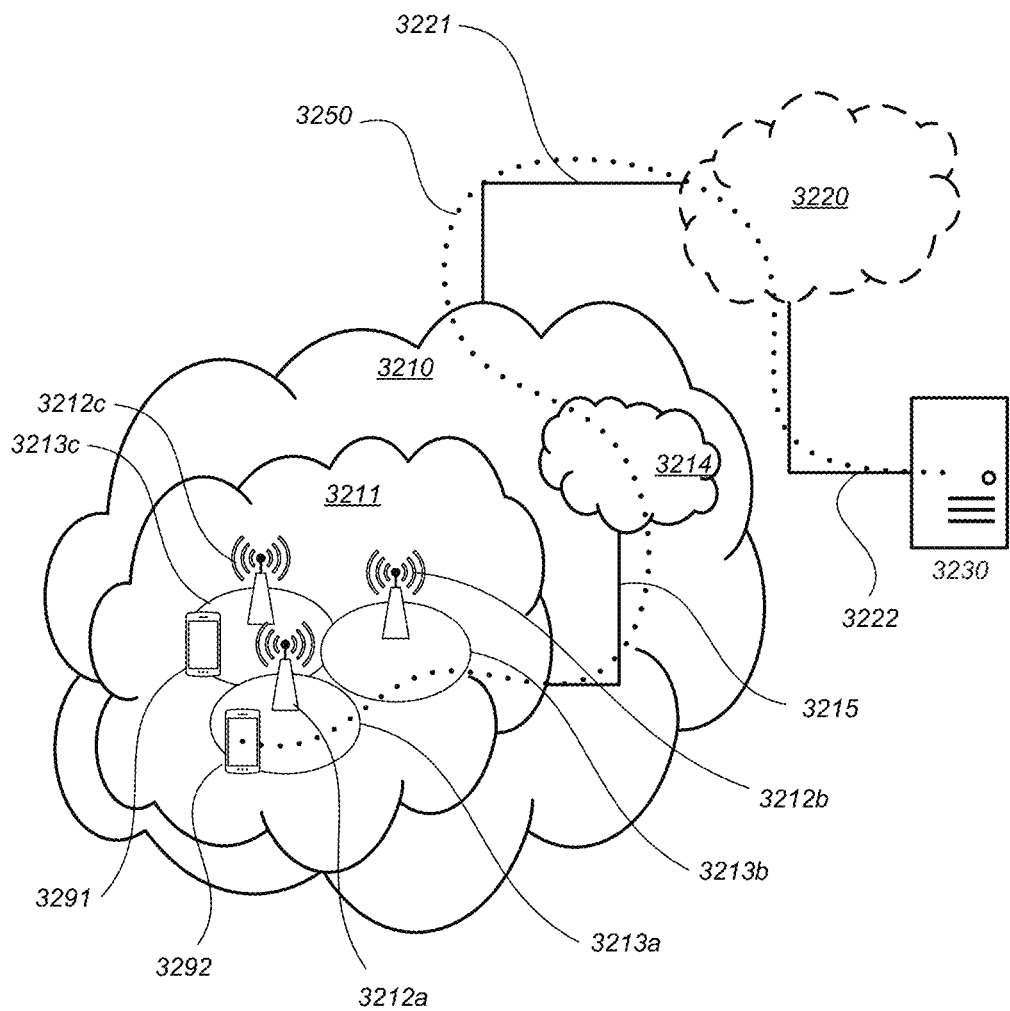
FIG. 12 is a diagram showing a telecommunication network connected via an intermediate network to a host computer in accordance with some embodiments.

With reference to FIG. 12, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 12 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 13. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 13) served by base station 3320. Communication interface 3326 may be configured to facilitate connection 3360 to host computer 3310. Connection 3360 may be direct or it may pass through a core network (not shown in FIG. 13) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

Figure 13:
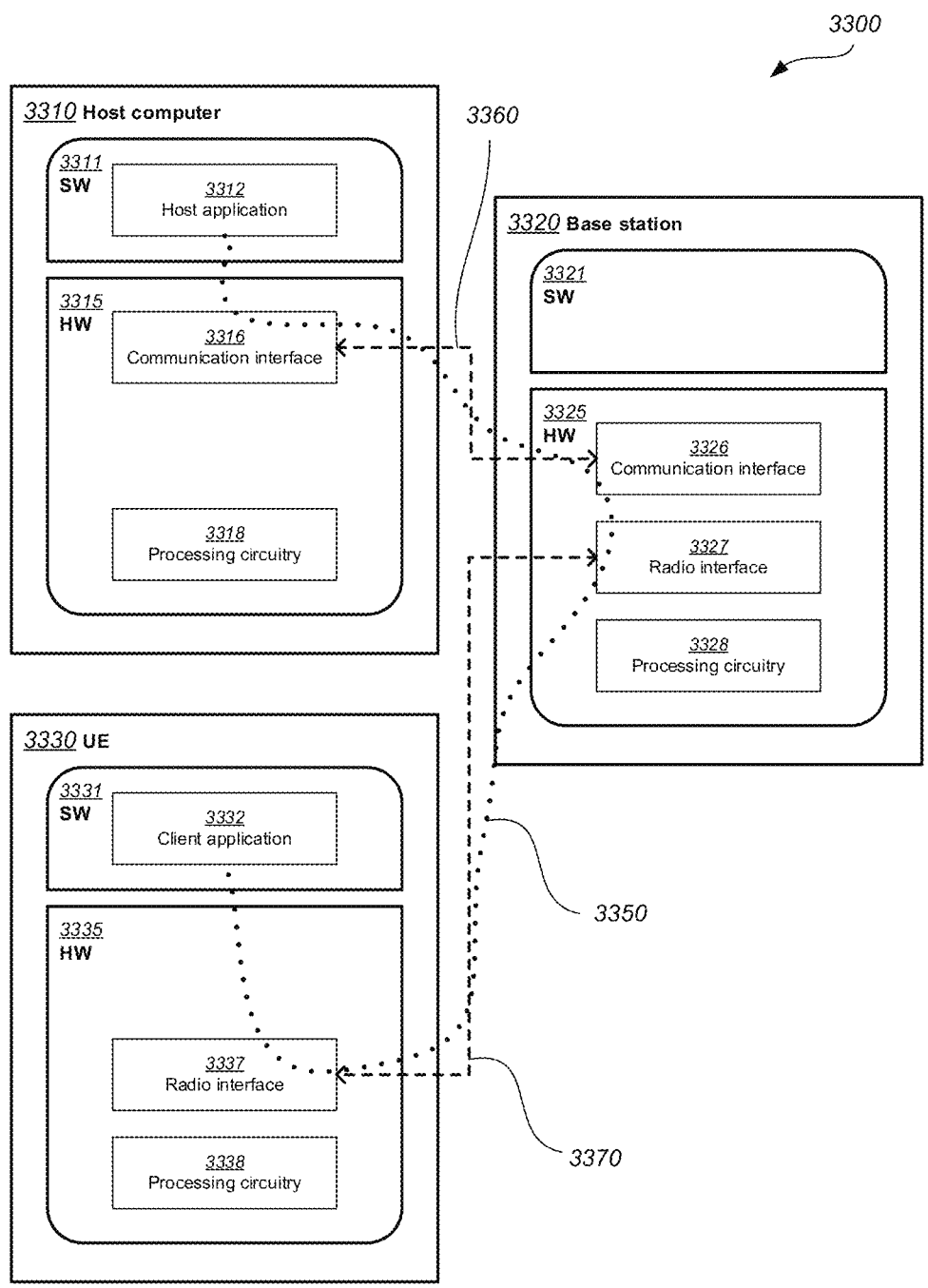
FIG. 13 is a diagram showing a host computer communicating via a base station with a user equipment in accordance with some embodiments.

It is noted that host computer 3310, base station 3320 and UE 3330 illustrated in FIG. 13 may be similar or identical to host computer 3230, one of base stations 3212a, 3212b, 3212c and one of UEs 3291, 3292 of FIG. 12, respectively. This is to say, the inner workings of these entities may be as shown in FIG. 13 and independently, the surrounding network topology may be that of FIG. 12.

In FIG. 13, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency and thereby provide benefits such as reduced user waiting time.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 14:
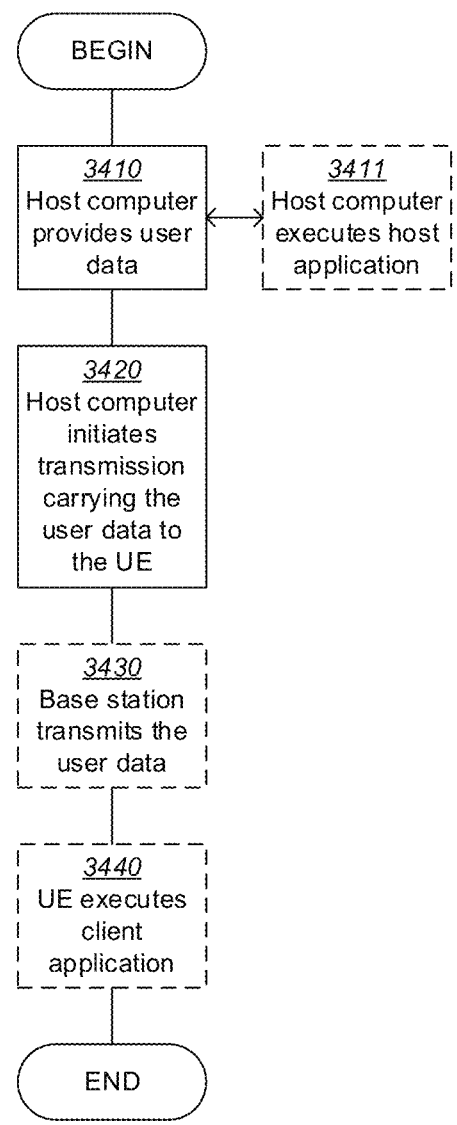
FIG. 14 is a flowchart illustrating a method implemented in a communication system in accordance with some embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 15:
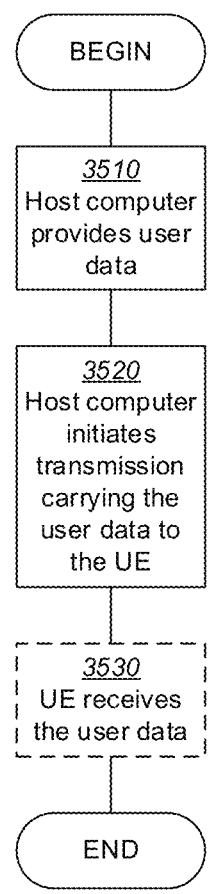
FIG. 15 is a flowchart illustrating a method implemented in a communication system in accordance with some embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 16:
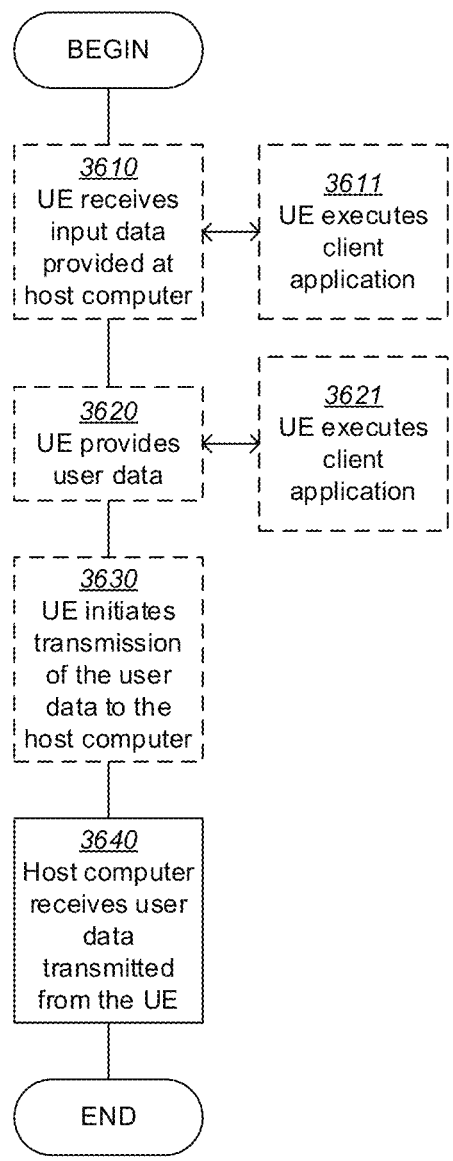
FIG. 16 is a flowchart illustrating a method implemented in a communication system in accordance with some embodiments.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 17:
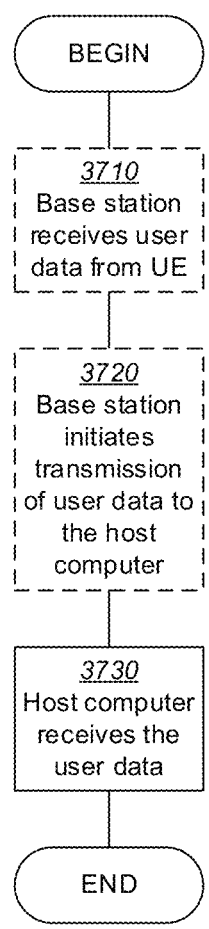
FIG. 17 is a flowchart illustrating a method implemented in a communication system in accordance with some embodiments.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method performed by a terminal device configured to transmit on a physical uplink (UL) shared channel (PUSCH) and on a physical UL control channel (PUCCH), the method comprising:
   when a configured grant (CG) of resources of the PUSCH overlaps in time with available resources of the PUCCH, determining relative priority between transmission of CG UL control information (CG-UCI) in the CG resources of the PUSCH and a hybrid automatic repeat request acknowledgement (HARQ-ACK) in the resources of the PUCCH, based on the following:
      a priority of UL data to be transmitted together with the CG-UCI in the CG resources of the PUSCH, and
      a priority of downlink (DL) data associated with the HARQ-ACK;
   selectively transmitting, based on the relative priority, the CG-UCI in the CG resources of the PUSCH or the HARQ-ACK in the resources of the PUCCH, wherein selectively transmitting based on the relative priority comprises:
      transmitting the CG-UCI on the CG resources of the PUSCH when the UL data has a higher priority than the DL data; and
      transmitting the HARQ-ACK on the resources of the PUCCH when the DL data has a higher priority than the UL data.

2. The method of claim 1, wherein the priority of the UL data is based on a priority of a logical channel (LCH) associated with the UL data, and the priority of the DL data is based on a priority of an LCH associated with the DL data.

3. The method of claim 1, wherein:
   the relative priority is further based on a queuing delay of the UL data in the terminal device; and
   selectively transmitting based on the relative priority further comprises:
      transmitting the CG-UCI on the CG resources of the PUSCH when the queuing delay of the UL data is less than a delay threshold; and
      transmitting the HARQ-ACK on the resources of the PUCCH when the queuing delay of the UL data is greater than or equal to the delay threshold.

4. The method of claim 1, wherein:
   the relative priority is further based on a duration between reception of the DL data and next available resources of the PUCCH; and
   selectively transmitting based on the relative priority further comprises:
      transmitting the CG-UCI on the CG resources of the PUSCH when the duration is less than or equal to a maximum delay between reception of the DL data and transmission of the HARQ-ACK associated with the DL data delay; and
      transmitting the HARQ-ACK on the resources of the PUCCH when the duration is greater than the maximum delay.

5. The method of claim 4, wherein the duration being greater than the maximum delay is associated with a HARQ failure.

6. A terminal device configured to transmit on a physical uplink (UL) shared channel (PUSCH) and on a physical UL control channel (PUCCH), the terminal device comprising:
   at least one processor; and
   at least one memory storing instructions executable by the at least one processor, wherein execution of the instructions by the at least one processor configures the terminal device to:
      when a configured grant (CG) of resources of the PUSCH overlaps in time with available resources of the PUCCH, determine relative priority between transmission of CG UL control information (CG-UCI) in the CG resources of the PUSCH and a hybrid automatic repeat request acknowledgement (HARQ-ACK) in the resources of the PUCCH, based on the following:
         a priority of UL data to be transmitted together with the CG-UCI in the CG resources of the PUSCH, and
         a priority of downlink (DL) data associated with the HARQ-ACK;
      selectively transmit, based on the relative priority, the CG-UCI in the CG resources of the PUSCH or the HARQ-ACK in the resources of the PUCCH, based on:
         transmitting the CG-UCI on the CG resources of the PUSCH when the UL data is determined to have a higher priority than the DL data; and
         transmitting the HARQ-ACK on the resources of the PUCCH when the DL data is determined to have a higher priority than the UL data.

7. The terminal device of claim 6, wherein the priority of the UL data is based on a priority of a logical channel (LCH) associated with the UL data, and the priority of the DL data is based on a priority of an LCH associated with the DL data.

8. The terminal device of claim 6, wherein:
   the relative priority is further based on a queuing delay of the UL data in the terminal device; and
   execution of the instructions by the processor configures the terminal device to selectively transmit based on the relative priority further by:
      transmitting the CG-UCI on the CG resources of the PUSCH when the queuing delay of the UL data is less than a delay threshold; and
      transmitting the HARQ-ACK on the resources of the PUCCH when the queuing delay of the UL data is greater than or equal to the delay threshold.

9. The terminal device of claim 6, wherein:
the relative priority is further based on a duration between reception of the DL data and next available resources of the PUCCH; and
execution of the instructions by the processor configures the terminal device to selectively transmit based on the relative priority further by:
  transmitting the CG-UCI on the CG resources of the PUSCH when the duration is less than or equal to a maximum delay between reception of the DL data and transmission of the HARQ-ACK associated with the DL data delay; and
  transmitting the HARQ-ACK on the resources of the PUCCH when the duration is greater than the maximum delay.

10. The method of claim 9, wherein the duration being greater than the maximum delay is associated with a HARQ failure.

* * * * *